June 16, 1942.

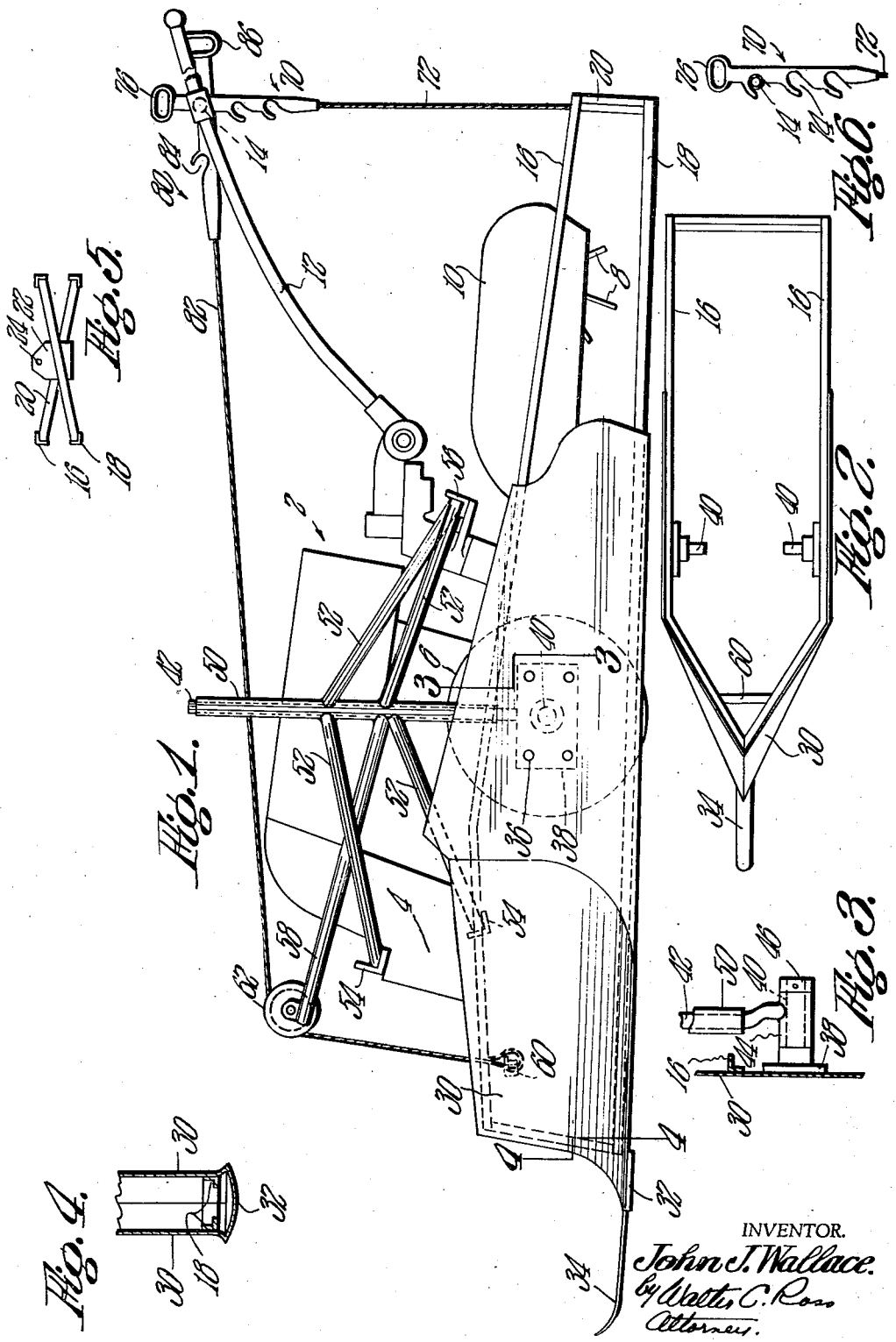

J. J. WALLACE 2,286,592

TILLING APPARATUS

Filed Aug. 19, 1941

INVENTOR.
John J. Wallace.
BY
Walter C. Ross, Attorney.

Patented June 16, 1942

2,286,592

UNITED STATES PATENT OFFICE 2,286,592

TILLING APPARATUS

John J. Wallace, Springfield, Mass.

Application August 19, 1941, Serial No. 407,466

4 Claims. (Cl. 97—192)

This invention relates to improvements in guard means for a machine for working the soil and is particularly directed to the provision of a novel guard construction for association with a soil-working machine such as a tiller, cultivating tractor, and the like.

It is one of the principal objects of the invention to provide a guard construction adapted for association with any type of soil-working machine and which is simple and economical to manufacture. As will appear, the construction is not only variable as to the type of machine with which it may be used but it may vary in size, shape and general form.

It is a well known fact that tillers or cultivating tractors of ordinary construction cannot be satisfactorily used to work the soil around evergreens, for example, or other trees, shrubbery, and the like having low-lying branches for the reason that the wheels and other parts of the machine crush or otherwise injure those branches. A tree or shrub which has these lower limbs or branches damaged or missing is of negligible value commercially.

Accordingly I have provided a guard construction which may readily be built into or on the tractor by the manufacturer thereof or be purchased as a separate unit and attached to the conventional machine with facility. As will be seen, the guard is so constructed that the shrubs and trees are protected against being crushed or trampled upon by the wheels of the machine.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a side elevational view of a conventional type of soil-working machine, having the guard construction of the invention associated therewith;

Fig. 2 is a top plan view of the supporting structure and guard;

Fig. 3 is a sectional view on the line 3—3 of Fig. 1;

Fig. 4 is a sectional view on the line 4—4 of Fig. 1;

Fig. 5 is a rear end elevational view of the supporting structure;

Fig. 6 is a side elevational view of a holding member to explain certain features of the invention.

Figure 7:
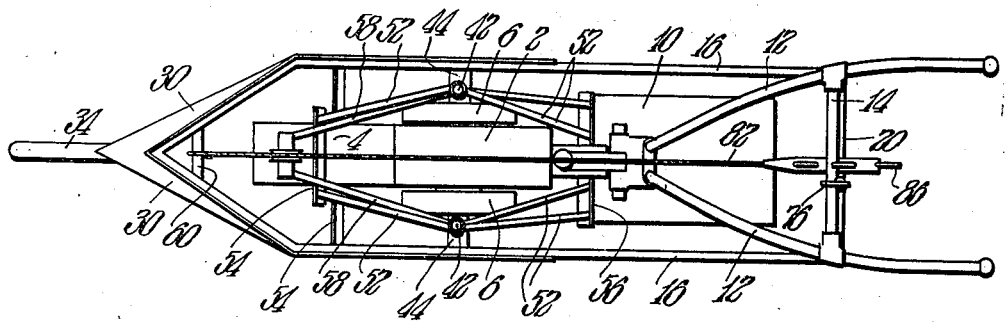
Fig. 7 is a top plan view of what is shown in Fig. 1.

Referring now to the drawings more in detail, the invention will be fully described.

In general, the soil-working machine, whatever its nature, is supported by, and is tiltable up and down relative to, a pair of side traction wheels which, of course, rest on the ground and thus the machine is mounted for tilting movements on a single axle. Furthermore, as will appear, the guard construction includes a supporting structure which is secured to the machine so as to be movable with the machine while at the same time the guard means and its supporting structure are tiltable up and down relative to the machine.

The machine, indicated generally by 2, has a driving engine 4 operably connected to side wheels 6 which support the machine in movement along the ground. At the rear of the machine are a plurality of hooks or fork-like members 8 for working the soil which are driven from the engine and rotated as the tractor moves. These usually have a guard member 10 overlying them.

A pair of spaced handle members 12 extend upwardly and rearwardly from the body of the machine and there may be a transverse rod member 14 extending therebetween. The arrangement is such that by manual operation of the handle members, the operator may tilt the machine forwardly or rearwardly on the axle of the wheels.

Obviously the handles serve to permit guiding the direction of the machine and, if desired, they may be pivoted for adjustment as indicated.

The supporting structure of the guard means may vary in form but preferably includes a plurality of frame-forming longitudinally extending irons. Spaced upper and lower irons, 16 and 18 respectively, extend along opposite sides of the machine and there may be crossed members 20 extending between the rear ends of said irons 16 and 18 as shown in Fig. 5.

A plate or bracket member 22 is preferably secured to one or both of members 20 and this may have an opening 24 therein for a purpose which will presently appear. The forward ends of irons 16 are preferably joined together in some suitable manner as are those of the irons 18.

It is desired to point out that these various frame-forming members may be secured to one another by soldering, welding, or in any other manner, as is true of the other secured parts which are about to be described.

Secured to this frame at opposite sides of the machine are a pair of vertically-extending guard plates 30. The plates are arranged in forwardly converging relation as shown in Fig. 2 and preferably flare outwardly at their lower forward sides as shown in Fig. 1.

Secured to the plates 30 and extending between their lower forward sides is a shoe part 32 which facilitates riding of the guard construction along the ground. Extending forwardly from the guard is a horn member 34 in the form of a flat steel strip having its forward end portion curving upwardly for getting under low-lying branches and limbs and lifting them up off the ground as the tractor moves.

Thus, the shrubbery is urged upwardly and away from possible contact with the wheels and the guard holds them away from the machine until after the soil has been worked.

Attached to the plates 30, as by rivets 36, are brackets or plates 38. These oppositely-disposed members 38 are provided with inwardly-extending studs 40.

A vertical rod 42 extends upwardly at each side of the machine and has a hub 44 on its lower end rotatable on a stud 40. Collars 46 are provided to hold the hubs on their bearings.

A fixed supporting structure is provided on the machine and includes hollow pipes 50 at opposite sides of the machine and rods 42 extend upwardly through them. Such members 50 are secured in fixed relation with respect to the machine as by supporting rods 52 having inner ends secured, as by welding or otherwise, to pipes 50 and outer ends secured to transversely-extending parts 54 and 56 at forward and rear sides of the machine.

Extending forwardly from the hollow members 50 are supports 58 and these support between their forward ends a pulley wheel 62. A transverse member 60 extends between and is secured to the plates 30 for a purpose to be described.

A holding member 70 is provided on one end of a line or rope 72 and the other end of the latter is attached to the rear end of supporting frame as by engagement in opening 24. The member 70 may have a plurality of spaced notches for receiving transverse member 14 and a manually engageable part 76.

Thus when it is desired to tilt the guard means forwardly and downwardly, the rear end of the guard-support may be elevated upwardly by pulling up on the line 72 and engaging member 14 in one of the lowermost notches 74. Release of the hoisting means from this position will, of course, result in lowering of the frame.

A holding member 80, similar to the member 70 is attached to one end of a line 82 which passes over and is guided by wheel 62 and has its other end looped around or otherwise attached to member 60. Member 80 has spaced notches 84 for receiving rod 14 and a manually-engageable part 86 and by pulling rearwardly on the latter, the forward end of the guard apparatus may be elevated.

As explained, by reason of the pivotal connections between slidable members 42 and the guard members 30, the latter and the parts carrying the same may thus be tilted on an axis which is substantially in the same plane as the axle supporting the tractor wheels. By pulling both lines 72 and 82 in the direction of member 14, the whole structure may be moved up with the rods 42 being slidable in and guided by pipes 50.

It will also be appreciated that in normal working position of the apparatus, the guard rests on the ground and slides therealong as the machine moves. The pivotal connections referred to permit the guard to move up or down to accommodate irregularities in the surface of the ground and when it is desired to turn around or the like, the guard may be lifted up by the flexible cables 72 and 82.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A guard construction for use with a soil working machine supported by and tiltable up and down relative to side traction wheels comprising in combination, a supporting structure for securement to said machine, guard members arranged in converging relation for disposition at one end of said machine, members slidable up and down in said supporting structure, and pivotal connections between said slidable members and guard members, all adapted and arranged whereby said guard members are movable up and down and tiltable relative to said supporting structure.

2. The combination of a soil working machine supported on and driven by traction wheels and tiltable relative thereto with guard means comprising, a supporting structure secured to said machines, guard members at the sides of said machine having ends in converging relation at one end thereof, and connections associated with said guard members and supporting structure arranged and adapted to facilitate up and down and tilting movements of the guard members relative to the supporting structure, said connections including members slidable up and down relative to said supporting structure and pivotal connections between said members and guard members.

3. The combination of a soil working machine supported on and driven by traction wheels and tiltable relative thereto with guard means comprising, a guard including guard members at opposite sides of the machine having ends in converging relation forwardly of one end of said machine, guide means associated with said machine and members slidable up and down therein, pivotal connections associated with said slidable members and guard members, and means acting on said guard members for moving the slidable members upwardly and for moving opposite ends of the guard upwardly relative to the slidable members.

4. The combination of a soil working machine supported on and driven by traction wheels and tiltable relative thereto with guard means comprising, a guard including guard members at opposite sides of the machine having ends in converging relation forwardly of one end of said machine, a member at the point of convergence of the guard members at the lower edges thereof having a lower curving surface and a horn extending therefrom forwardly of said member, guide means associated with said machine and members slidable up and down therein, pivotal connections associated with said slidable members and guard members, and means acting on said guard members for moving the slidable members upwardly and for moving opposite ends of the guard upwardly relative to the slidable members.

JOHN J. WALLACE.